Patented Apr. 25, 1939

2,155,539

UNITED STATES PATENT OFFICE 2,155,539

PIGMENTED RUBBER COMPOSITION

Henry A. Gardner, Washington, D. C.

No Drawing. Application March 13, 1936,
Serial No. 68,777

6 Claims. (Cl. 106—23)

This invention relates to pigment-containing rubber compositions, and is concerned more particularly with a composition comprising rubber or rubber-like compounds and a metallic phthalate.

It is known that ultra-violet light is destructive to rubber films, filaments, sheets or masses, accelerating the "aging" of the rubber.

I have found that a film of rubber pigmented with metallic phthalate exhibits a longer useful life than does a film of rubber alone or of rubber pigmented with a common rubber pigment. Also, I have found that improvements in the strength, period of useful life, and other physical characteristics of heat-vulcanized rubber sheets and masses may be effected by incorporating into the rubber mix finely divided metallic phthalate substituted for all or part of the conventional pigment or added in addition thereto.

From my researches on this subject I have concluded that some of these desirable effects produced by the pigmentary metallic phthalates in the rubber may properly be ascribed to their property of minimizing the transmission of ultra-violet light by said rubber. For instance, practically all white pigments transmit large percentages of ultraviolet light, the transmission of some pigments ranging from 50 to 70 percent between 3023 and 4358 Angstrom units, whereas most white pigments of the phthalate group, such for instance as lead or titanium phthalates, transmit from 0 to about 10 percent in the same wave lengths.

Thus, to 100 parts by weight of a 10% solution of milled rubber in toluol or a 10% solution of chlorinated rubber in toluol I have added about 5 parts by weight of lead phthalate, or other metallic phthalate, and pebble-ground the mixture. The mixture was then coated on panels in comparison with similar mixtures to which the metallic phthalates had not been added. These were exposed to extremely severe conditions, including strong light, salt water, and oxidizing atmospheres. The mixtures containing the phthalates proved extremely durable as compared to those without the phthalates.

The same desirable effect is produced when an emulsion of rubber or rubber-like compound, or other fluid dispersion of the same, is pigmented with metallic phthalate. The amount of pigment that I employ in these rubber coatings is usually from 30% to 80% of the actual rubber content thereof.

As a further illustration of the invention the following comparative experiment is given.

Two rubber mixes were prepared in conformity with the following formulae, the numerical values representing parts by weight:

|  | A | B |
|---|---|---|
| Rubber | 300 | 300 |
| Zinc oxide | 363 | 10 |
| Lead phthalate |  | 205 |
| Stearic acid | 3 | 3 |
| Sulphur | 9 | 9 |
| Mercaptobenzothiazol | 2.4 | 2.4 |

The lead phthalate milled into the rubber with desirable ease and rapidity, no difficulty being evidenced. Comparative samples of formulae A and B were cured for approximately 30 minutes at 40 pounds steam pressure, and thereafter were comparatively tested. It was found that sample B had a tensile strength value of about 3500 pounds, as contrasted with sample A's tensile strength value of about 2900 pounds. Sample B was found to have, as contrasted with sample A, a longer period of useful life as determined by accelerating aging tests.

It will be understood that Formula B above is merely illustrative of the invention, that the latter is not limited to any particular ingredients, or proportions, aside from the rubber or equivalent, vulcanizing agent (sulphur) and metallic phthalate. Usually for each 300 pounds of rubber I employ from 100 to 300 pounds of the pigment according to the specific gravity of the pigment and the desired stiffness of the rubber product.

In later tests I have found that somewhat similar but even more interesting results may be obtained through the use of a pigment made by treating leaded zinc with phthalic acid. This pigment, which usually contains about 35 parts by weight of lead sulphate and 65 parts by weight of zinc oxide, after treatment with a water solution of phthalic acid becomes phthalated. I usually employ for this purpose 5 to 25 parts of phthalic acid to 100 parts of leaded zinc. The resulting dry phthalated pigment has given extraordinary results in rubber compositions, including not only solid rubber mixes but also solutions, emulsions and other fluid dispersion of rubber.

Since I have determined experimentally that the aforesaid desirable effects of metallic phthalate appertain not only to compositions comprising the same and the natural product known as "rubber" but also to compositions comprising the same and rubber derivatives, chlorinated rubber, polychloroprene, olefine sulphides, sulphur-treated rubber, and other chemically processed rubber compounds including compositions consisting mainly of rubber hydrocarbon such as the acid-, alkali-, and water-resistant coating composition containing upwards of 95% of rubber hydrocarbon marketed under the name "Pliolite", I intend by the term "rubber" as used hereinafter in the claims to include natural rubber and all such rubber-like compounds. By the term "metallic phthalate" I mean to include phthalate salts of barium, iron, lead, manganese, titanium and zinc. Also, the said term is intended to include (1) a composite pigment comprising particles of a pigment, e. g., a conventional rubber pigment such as zinc oxide, or the like, carrying on their surfaces deposits of one or more of the aforesaid metallic salts of phthalic acid; and (2) phthalated pigments as above described.

I claim:

1. A rubber composition consisting essentially of a rubber mass containing dispersed therethrough a metallic phthalate in an amount at least equal to 30% by weight of the rubber content of the composition.

2. A heat-vulcanizable rubber mix containing a metallic phthalate in an amount equalling from about 30% to about 100% of the rubber content of the rubber mix.

3. A film-forming composition comprising a liquid dispersion of rubber and metallic phthalate, the latter being present in the composition in an amount at least equalling 30% by weight of the rubber content of the composition.

4. Method of enhancing the period of useful life of a rubber compound which consists in dispersing therein a metallic phthalate in an amount at least equalling 30% by weight of the rubber compound.

5. A rubber composition consisting essentially of a rubber mass containing dispersed therethrough zinc phthalate.

6. A rubber composition consisting essentially of a rubber mass containing dispersed therethrough lead phthalate.

HENRY A. GARDNER.